United States Patent [19]

Borchardt

[11] Patent Number: 4,710,251
[45] Date of Patent: Dec. 1, 1987

[54] PROCESS FOR MANUFACTURING ENDLESS BELTS

[75] Inventor: Horst Borchardt, Höxter, Fed. Rep. of Germany

[73] Assignee: Arntz-Optibelt-KG, Hoxter, Fed. Rep. of Germany

[21] Appl. No.: 611,172

[22] Filed: May 17, 1984

[30] Foreign Application Priority Data

May 20, 1983 [DE] Fed. Rep. of Germany ....... 3318470

[51] Int. Cl.$^4$ .............................................. F16G 5/00
[52] U.S. Cl. ................................... 156/137; 156/139; 156/165; 156/382; 425/28 R; 425/33
[58] Field of Search ............... 156/137, 140, 165, 287, 156/139, 382; 425/28 R, 28 B, 32, 33

[56] References Cited

U.S. PATENT DOCUMENTS

| | | | |
|---|---|---|---|
| 3,338,020 | 8/1967 | McGee | 156/287 |
| 3,717,544 | 2/1973 | Valyl | 156/287 |
| 3,964,846 | 6/1976 | Bliss | 425/28 B |
| 3,996,967 | 12/1976 | Takada | 156/287 |
| 4,361,451 | 11/1982 | Renaud | 156/287 |
| 4,382,767 | 5/1983 | Naugle et al. | 156/287 |

FOREIGN PATENT DOCUMENTS

| | | | |
|---|---|---|---|
| 0557280 | 5/1958 | Canada | 156/137 |
| 840331 | 4/1970 | Canada . | |
| 1660056 | 1/1972 | Fed. Rep. of Germany . | |
| 1778999 | 5/1972 | Fed. Rep. of Germany . | |
| 2435669 | 2/1975 | Fed. Rep. of Germany . | |
| 0636142 | 4/1950 | United Kingdom | 156/140 |
| 0794860 | 5/1958 | United Kingdom | 156/140 |

Primary Examiner—Jay H. Woo
Assistant Examiner—Timothy W. Heitbrink
Attorney, Agent, or Firm—Penrose Lucas Albright

[57] ABSTRACT

Virtually inextensible V drive belts are manufactured from a sleeve of rubber containing substantially longitudinal polymer stability supports by vulcanizing the sleeve on a tubular former and immediately sealing the sleeve and former inside a sleeve member and thereafter while the sleeve is still warm stretching the belt sleeve radially by application of pressure medium between the former and the sleeve. The belt sleeve is then cooled under tension and cut into individual belts.

5 Claims, 4 Drawing Figures

PROCESS FOR MANUFACTURING ENDLESS BELTS

BACKGROUND OF THE INVENTION

1. Technical Field

The present invention relates to a process as well as an apparatus for the production of endless belts, particularly V-section drive belts.

2. Prior Art

DE-OS No. 1 660 056 shows a process for manufacturing V-belts, which are virtually inextensible in operation. In this process the V-belt is longitudinally stretched in the cold state on a stretching apparatus consisting of two rollers, and is subjected while stretched for a specific length of time to heating and subsequent cooling.

Furthermore, it is known that finished vulcanized belts may be stretched in the cold state by means of expanding mandrels beyond their nominal measurement, and then heated in this state for a specific length of time, and subsequently cooled to provide so-called low-stretch V-belts.

DE-OS No. 2 435 669 discloses a process of manufacturing V-belts of uniform length, according to which finished vulcanized V-belts are placed on a stretching apparatus consisting of two rollers, heated to a temperature above the vulcanization temperature, subsequently stretched once beyond the nominal measurement and then cooled at the nominal measurement.

DE-PS No. 1 778 999 relates to a process of manufacturing endless V-belts of uniform length, according to which belt blanks are first of all subjected to a prevulcanization process free from tension. An end vulcanization process is carried out while a tractive force is applied until the shrinkage which occurred during the first tension-free vulcanizing is cancelled. The length of the vulcanized belt is then measured under a standardized tractive force and the belt is stretched as required to the desired length and cooled in this condition.

These known processes suffer from the drawback that they are very costly and time-consuming. On the one hand, separate subsequent stretching equipment such as heating and cooling apparatus is necessary, and on the other hand continuous expenditure is required for heating, cooling and remuneration of the operators. A further drawback is that it is difficult to ensure that subsequent treatment occurs evenly over the entire belt length.

For some contemporary drives, e.g. in motor vehicles, there is a requirement for no maintenance or for a lengthening of the periods between maintenance operations. For V-belts this means that no substantial lengthening of the belt should occur in operation.

SUMMARY OF THE INVENTION

It is the object of the invention to provide a process as well as apparatus for the economic production of V-belts which are virtually inextensible.

The present invention provides a process of manufacturing virtually inextensible endless drive belts of natural or synthetic rubber including stability supports of synthetic polymers extending substantially longitudinally of the belt, including the steps of constructing a belt sleeve, vulcanizing the sleeve, radially stretching the sleeve on a tubular former immediately after vulcanization and using the remaining heat of the belt, cooling the sleeve under tension, and subsequently cutting the sleeve to provide individual V-belts.

In this process stretching is preferably effected evenly over the entire length of the belt sleeve.

Advantageously, the sleeve is stretched by a fixed percentage of its original length of the belt.

The invention further provides apparatus for carrying out the process according to the invention including a sleeve member, a tubular former having inner and outer surfaces and adapted to be sheathed on said outer surface by a belt sleeve, said former being disposed within and at a predetermined distance from said sleeve member, the tubular former defining on said inner surface at least one annular channel, at least one transverse channel defined between said surfaces of said former and in communication with said annular channel.

DESCRIPTION OF A PREFERRED EMBODIMENT

Figure 1:
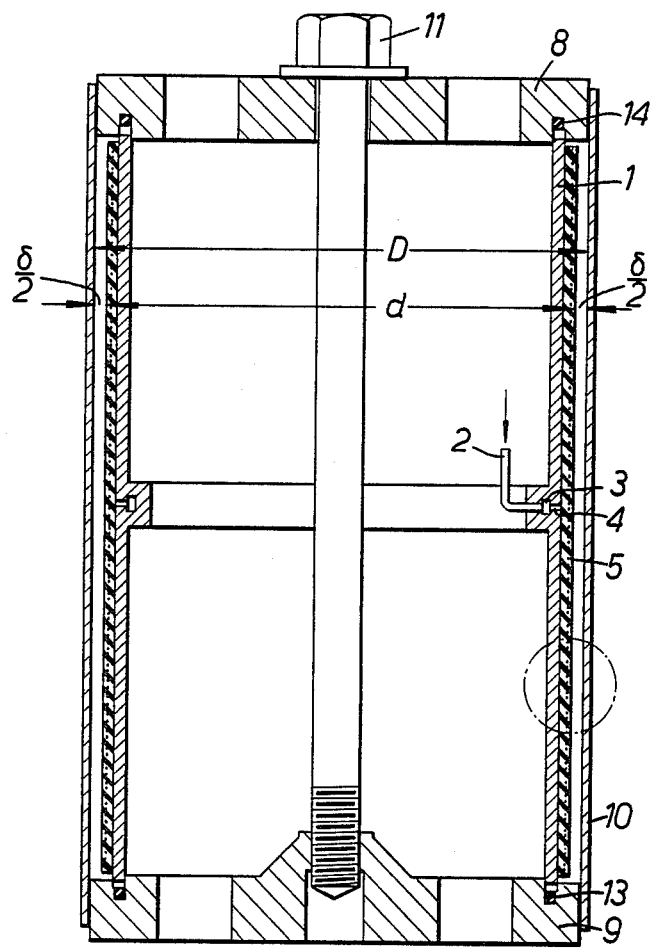
FIG. 1 is a longitudinal section of apparatus for manufacturing belt sleeves immediately after vulcanization and before stretching.
Figure 2:
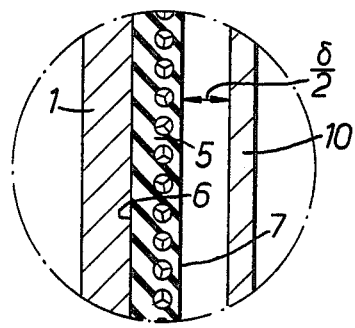
FIG. 2 is a magnified representation of a portion of FIG. 1.

FIG. 1 shows a tubular former 1 with a duct 2 for supplying pressure medium which enters the former via an annular channel 3 from which channels 4 pass radially outwardly through the wall of the tubular former 1. Tubular former 1 is represented as having a smooth outer surface. However, the outer surface may have axial longitudinal grooves for the production of so-called form-toothed V-belts.

Closure covers 8 and 9 are fitted to opposite ends of the tubular former 1. The former 1 is surrounded by a belt sleeve 5 which is initially positioned so that its inner surface 6 contacts the outer surface of the tubular former 1. The closure covers 8 and 9 seal the space between the former and sleeve and are fitted immediately after the completion of vulcanization which takes place e.g. in a non-represented autoclave.

A non-stretchable sleeve member 10 is sheathed around the assembly after vulcanization. The inner diameter D of the sleeve member 10 is greater by the desired amount 5 of radial stretch of the belt sleeve 5 than the external diameter d of the unstretched belt sleeve 5. A clamping device is then fitted to clamp the closure covers 8 and 9 together. This clamping device consists of a clamp bolt 11 which passes through the tubular former 1. A nut is applied against one closure cover 8, and the screw thread of the bolt is screwed into a threaded opening in the other closure cover 9. During the clamping process the two closure covers 8 and 9 are moved towards each other, as a result of which they create a seal between the end faces of the belt sleeve 5 and the closure covers 8 and 9. In addition, by means of elastic sealing members 13 and 14, seals are provided between the tubular former 1 and the closure covers 8 and 9.

Pressure medium is supplied via the duct 2, the annular channel 3 and the radial channels 4, to cause the belt sleeve 5 to expand, as a result of which its inner surface 6 comes away from the tubular former 1, until the outer surface 7 of the sleeve is against the inner surface of the sleeve member 10 which acts as a stretch limiter.

Figure 3:
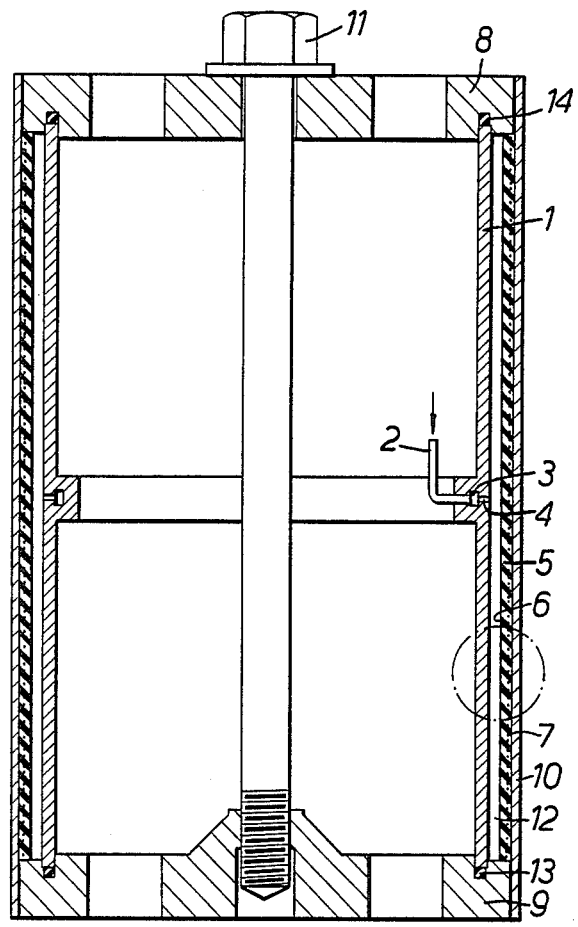
FIG. 3 is a longitudinal section of the apparatus of FIG. 1 after stretching has been effected.
Figure 4:
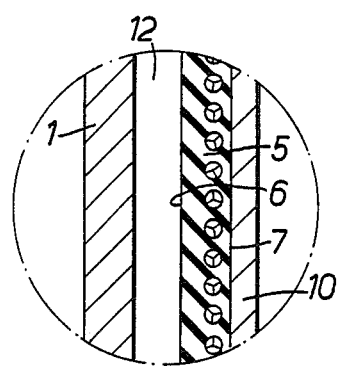
FIG. 4 is a magnified representation of a portion of FIG. 3.

The sleeve 5 is now in the position shown in FIGS. 3 and 4. The Application of the closure covers 8 and 9 as well as the axial deformation and the admission of pressure medium must be effected within the shortest possible time, so that the subsequent stretching takes place almost at vulcanization temperature. The belt sleeve is subsequently cooling down under expansion pressure and cut into individual V-belts.

With the described method and apparatus it is possible to manufacture at favourable cost drive belts, particularly V-belts, which suffer almost no stretching in operation, by utilizing their own heat, immediately after vulcanization, as well as, making use of the same vulcanization mould with the aid of a pressure medium. These V-belts have even characteristics over their entire length. A further advantage lies in that it is possible also to produce belts of small length with low-stretch characteristics. Such small belts can not be readily produced using known two-roller systems. Furthermore, there is no need for separating means or a special lifting device for the separation of the belt sleeves from the vulcanization mould.

I claim:

1. A process of manufacturing virtually inextensible endless drive belts of natural or synthetic rubber including stability supports of synthetic polymers extending substantially longitudinally of the endless drive belts, said process including the steps of constructing a belt sleeve, vulcanizing the belt sleeve while supported on a tubular former, radially stretching the belt sleeve on said tubular former immediately after vulcanization while the belt sleeve retains heat, cooling the belt sleeve under tension, and subsequently cutting the belt sleeve to provide individual V-belts.

2. A process according to claim 1, in which the stretching step is effected with the aid of a pressure medium.

3. A process according to claim 1, in which the stretching is effected evenly over the entire length of the belt sleeve.

4. A process according to claim 1, in which the belt sleeve is stretched by a predetermined percentage of its original length.

5. A process of manufacturing virtually inextensible drive belts including the steps of vulcanizing a belt sleeve on a former, sealing the former within a sleeve member, immediately after the vulcanizing step forcing a pressure medium between the former and the vulcanized belt sleeve to stretch said vulcanized belt sleeve uniformly while the vulcanized belt sleeve retains some of the heat of the vulcanization process, cooling the vulcanized belt sleeve under pressure and cutting the vulcanized belt sleeve into individual endless belts.

* * * * *